Patented May 20, 1952

2,597,741

UNITED STATES PATENT OFFICE 2,597,741

ELECTRICAL-CONDUCTIVE RUBBERY COMPOSITION AND METHOD OF MAKING SAME

Joseph Hugh Macey, Akron, Ohio, assignor to The B. F. Goodrich Company, New York, N. Y., a corporation of New York No Drawing. Application November 29, 1950, Serial No. 198,246

13 Claims. (Cl. 260—41.5)

This invention relates to a rubbery composition and pertains more particularly to an electrical-conductive rubbery composition capable of readily discharging to an electrical ground static electrical charges developed therein and the method of making same.

It is an object of this invention to provide an electrical-conductive rubbery composition adapted to readily discharge static electrical charges developed therein minimizing the possibility of the formation of a sufficient electrical potential between the rubbery composition and an adjacent article to cause sparking.

It is also an object of this invention to provide an electrical-conductive rubbery composition capable of being readily fabricated into numerous configurations.

Another object of this invention is to provide a vulcanized rubbery composition which inherently possesses a low electrical resistivity.

Still another object of this invention is to provide a convenient and economical method for making a vulcanized electrical-conductive rubbery composition.

Other objects of this invention will be apparent from the description which follows.

The accumulation of static electrical charges on rubber articles often causes serious hazardous conditions to arise, in that the electrical potential may become so great that a discharge of the electrical potential occurs in the form of a spark which may ignite inflammable and/or explosive materials in the immediate vicinity or cause discomfort to a person coming in contact therewith. To minimize the hazard of sparking caused by the instantaneous discharge of static electrical charges, rubbery bodies in which static electrical charges may develop should desirably be fabricated of a composition having a low electrical resistivity allowing static electrical charges formed therein to be harmlessly conducted to an electrical ground before a sufficient accumulation of static electrical charges has occurred to cause a spark to form between two or more bodies. In addition, the combination of electrical conductivity with the physical and chemical properties of rubber compositions may be desirable for other purposes. Since rubbery compositions ordinarily are inherently poor electrical conductors, special compounding techniques are required in order to obtain electrical-conductive rubber compositions. Various electrical-conductive rubbery compositions such as those containing acetylene black have been proposed but have not been entirely satisfactory, since large amounts of black are required to obtain a sufficiently low electrical resistivity.

I have found that the addition of polyethylene, which is in itself a dielectric material, to a rubber composition containing a conductive carbon black such as acetylene black will decrease the resistivity of the composition rather than increase it, contrary to all expectations.

Among the rubber-like materials which may be employed in my invention are natural rubber, such as caoutchouc (which is a rubbery polymer of isoprene) and the like, or synthetic rubber, such as the rubbery polymers of open-chained conjugated dienes having from four to eight carbon atoms exemplified by butadiene-1,3; 2,3-dimethyl butadiene-1,3; 1,4-dimethyl butadiene-1,3 and the like, or the rubbery copolymers of these and similar conjugated dienes with each other or with copolymerizable monomeric materials containing a single ethylenic linkage, such as styrene, acrylonitrile, methyl acrylate, methyl methacrylate, ethyl acrylate, ethyl methacrylate, 2-vinyl pyridine, or the rubbery polymers or copolymers of such dienes as chloroprene and the like, or similar materials. Preferably the rubber-like material employed in my rubbery compositions is a vulcanizable rubbery conjugated diene polymer.

The polyethylenes employed in my invention are polymers of ethylene which are essentially straight-chain aliphatic hydrocarbons of varying molecular weights and are produced by the polymerization of ethylene in the presence of an appropriate catalyst, such as benzoyl peroxide, and under conditions of intermediate to relatively high temperatures and pressures. It is desirable that my rubbery composition comprise from 10 to 125 parts by weight of a polyethylene for every 100 parts by weight of elastomeric material; however, to obtain optimum physical and chemical properties it is preferable that my rubbery composition comprise from 20 to 75 parts by weight of a polyethylene for every 100 parts by weight of elastomeric material. Preferably the polyethylene is a solid having a molecular weight of at least 6000, although liquid polyethylenes having a molecular weight of as low as 200 or less may be employed in this invention.

Electrical-conductive carbon blacks which may be employed in this invention are carbon blacks having a relatively low electrical resistivity, preferably a specific electrical resistance of approximately 100 ohm-cm. or less, such as acetylene black, conductive channel black and conductive furnace black. It is desirable that from 40 to 150 parts by weight of an electrical-conductive carbon black, preferably acetylene black, be incorporated in my rubbery composition for every 100 parts by weight of elastomeric material, however, to obtain optimum physical and chemical properties, it is preferable that from 80 to 130 parts by weight of an electrical-conductive carbon black be included in my rubbery composition for every 100 parts by weight of elastomeric or rubber-like material. Appropriate fillers, softeners, accelerators, age resisters, vulcanizing agents and reinforcing ingredients may also be included in my rubbery composition to impart desired characteristics to the rubbery composition.

The various components of my rubbery compositions may be compounded together in any conventional manner, such as by milling the ingredients together on a roll mill or by mixing the ingredients together in an internal mixer. Since polyethylene is compatible with the rubber material at normal mixing temperatures its incorporation presents no problem.

The following examples of rubbery compositions are cited merely to illustrate and fully teach my invention, however, it will be understood that I do not intend to limit the scope of this invention to these recipes.

Example 1

| Material: | Parts by weight |
| --- | --- |
| Natural rubber | 100.0 |
| Acetylene black | 80.0 |
| Polyethylene | 25.0 |
| Benzothiazyl disulfide | 1.4 |
| Sulfur | 2.0 |
| Zinc oxide | 3.0 |
| Syncera wax | 2.0 |
| Total | 213.4 |

The ingredients were compounded together on a roll mill and vulcanized in a mold at 292° for 15 minutes. The vulcanizate exhibited a specific resistance to the flow of an electrical current of less than 100 ohm-cm. at 20° C.

Example 2

| Material: | Parts by weight |
| --- | --- |
| Rubbery butadiene-styrene copolymer (GR-S) (72% conversion) | 100.0 |
| Polyethylene | 70.0 |
| Acetylene black | 100.0 |
| Sulfur | 2.3 |
| Zinc oxide | 3.0 |
| Syncera wax | 2.0 |
| Benzothiazyl disulfide | 1.5 |
| Total | 278.8 |

The ingredients were compounded together and vulcanized as in Example 1 and the vulcanizate possessed a specific resistance to the flow of an electrical current of less than 100-cm. at 20° C.

Example 3

| Material: | Parts by weight |
| --- | --- |
| Rubbery polymer of chloroprene | 100.0 |
| Acetylene black | 60.0 |
| Polyethylene | 50.0 |
| Zinc oxide | 5.0 |
| Sodium acetate | 1.0 |
| Magnesium oxide | 10.0 |
| Syncera wax | 2.0 |
| Total | 228.0 |

The ingredients were compounded together and vulcanized as in Example 1 and the vulcanizate exhibited a specific resistance to the flow of an electrical current of less than 100 ohm-cm. at 20° C.

Example 4

| Material: | Parts by weight |
| --- | --- |
| Rubbery butadiene-acrylonitrile copolymer (2:1) (Hycar OR-25) | 100.0 |
| Polyethylene | 25.0 |
| Acetylene black | 120.0 |
| Zinc oxide | 8.0 |
| Benzothiazyl disulfide | 2.0 |
| Sulfur | 2.0 |
| Tributoxyethyl phosphate | 40.0 |
| Total | 297.0 |

The ingredients were compounded together on a roll mill and vulcanized as in Example 1 and the vulcanizate possessed a specific resistance to the flow of an electrical current of less than 100 ohm-cm. at 20° C.

Rubbery compositions within the purview of this invention inherently possess a low electrical resistivity exhibiting a specific resistance to the flow of an electrical current of 100 ohm-cm. or less at 20° C. Conventional electrical-conductive rubbery compositions are much less satisfactory as electrical-conductive rubbery materials, since they exhibit a much higher specific resistance to the flow of an electrical current than do my rubbery compositions. For example, the rubbery composition set forth in Example 4 exhibited a specific resistance to the flow of an electrical current of less than 100 ohm-cm. at 20° C. while a rubbery composition identical to that of Example 4 except that no polyethylene was present exhibited a specific resistance of 1000 ohm-cm. at 20° C. Furthermore, the electrical conductivity of my rubbery compositions does not decrease upon flexure while a rubbery composition identical to the rubbery composition of Example 4 except that no polyethylene was included therein exhibited a specific resistance to the flow of an electrical current after flexure of about 40,000 or more ohm-cm. at 20° C.

My electrical-conductive rubbery compositions are particularly useful in rubbery articles utilized under conditions where the formation of static electrical charges are likely to occur and have proven extremely useful in articles such as gasoline-hose nozzles, anaesthesia masks, rubber hose, floor coverings, industrial belts, shoe soles, and the like.

It is clear that obvious modifications and variations of my invention may be made without departing from the spirit and scope of this invention as defined in the appended claims.

I claim:

1. A vulcanizable rubbery composition comprising a vulcanizable rubbery conjugated diene polymer, from 10 to 125 parts by weight of polyethylene for every 100 parts by weight of said rubbery conjugated diene polymer, and from 40 to 150 parts by weight of an electrical-conductive carbon black for every 100 parts by weight of said rubbery conjugated diene polymer.

2. A vulcanizable electrical-conductive rubbery composition comprising a vulcanizable rubbery conjugated diene polymer, from 20 to 75 parts by weight of polyethylene for every 100 parts by weight of said rubbery conjugated diene polymer, and from 40 to 150 parts by weight of an electrical-conductive carbon black for every 100 parts by weight of said rubbery conjugated diene polymer.

3. A vulcanizable electrical-conductive rubbery composition comprising a vulcanizable rubbery conjugated diene polymer, from 10 to 125 parts by weight of polyethylene for every 100 parts by weight of said rubbery conjugated diene polymer, and from 80 to 130 parts by weight of an electrical-conductive carbon black for every 100 parts by weight of said rubbery conjugated diene polymer.

4. A vulcanizable electrical-conductive rubbery composition comprising a vulcanizable rubbery conjugated diene polymer, from 20 to 75 parts by weight of polyethylene for every 100 parts by weight of said rubbery conjugated diene polymer, and from 80 to 130 parts by weight of an electrical-conductive carbon black for every 100 parts by weight of said rubbery conjugated diene polymer.

5. An electrical-conductive rubbery composition comprising a vulcanized rubbery conjugated diene polymer, from 10 to 125 parts by weight of polyethylene for every 100 parts by weight of said rubbery conjugated diene polymer, and from 40 to 150 parts by weight of an electrical-conductive carbon black for every 100 parts by weight of said rubbery conjugated diene polymer.

6. An electrical-conductive rubbery composition comprising a vulcanized rubbery conjugated diene polymer, from 20 to 75 parts by weight of polyethylene for every 100 parts by weight of said rubbery conjugated diene polymer, and from 40 to 150 parts by weight of an electrical-conductive carbon black for every 100 parts by weight of said rubbery conjugated diene polymer.

7. An electrical-conductive rubbery composition comprising a vulcanized rubbery conjugated diene polymer, from 10 to 125 parts by weight of polyethylene for every 100 parts by weight of said rubbery conjugated diene polymer, and from 80 to 130 parts by weight of an electrical-conductive carbon black for every 100 parts by weight of said rubbery conjugated diene polymer.

8. An electrical-conductive rubbery composition comprising a vulcanized rubbery conjugated diene polymer, from 20 to 75 parts by weight of polyethylene for every 100 parts by weight of said rubbery conjugated diene polymer, and from 80 to 130 parts by weight of an electrical-conductive carbon black for every 100 parts by weight of said rubbery conjugated diene polymer.

9. An electrical-conductive rubbery composition comprising a vulcanized rubbery conjugated diene polymer, from 20 to 75 parts by weight of polyethylene for every 100 parts by weight of said rubbery conjugated diene polymer, and from 80 to 130 parts by weight of an acetylene black for every 100 parts by weight of said rubbery conjugated diene polymer.

10. A rubber-like composition comprising a rubbery polymer of chloroprene, from 10 to 125 parts by weight of polyethylene for every 100 parts by weight of said rubbery polymer of chloroprene, and from 40 to 150 parts by weight of an electrical-conductive carbon black for every 100 parts by weight of said rubbery polymer of chloroprene.

11. The method of making an electrical-conductive rubbery composition which comprises blending a vulcanizable rubbery conjugated diene polymer and from 10 to 125 parts by weight of polyethylene for every 100 parts by weight of said rubbery conjugated diene polymer together, dispersing from 80 to 130 parts by weight for every 100 parts by weight of said rubbery conjugated diene polymer of an electrical-conductive carbon black into said blend, and vulcanizing the rubbery composition.

12. The method of making an electrical-conductive rubbery composition which comprises blending together a vulcanizable rubbery conjugated diene polymer and from 20 to 75 parts by weight of polyethylene for every 100 parts by weight of said rubbery conjugated diene polymer, dispersing into the resulting blend from 40 to 150 parts by weight of an electrical-conductive carbon black for every 100 parts by weight of said rubbery conjugated diene polymer, and vulcanizing the rubbery composition.

13. The method of making an electrical-conductive rubbery composition which comprises blending together a vulcanizable rubbery conjugated diene polymer and from 20 to 75 parts by weight of polyethylene for every 100 parts by weight of said rubbery conjugated diene polymer, dispersing into the resulting blend from 80 to 130 parts by weight of an electrical-conductive carbon black for every 100 parts by weight of said rubbery conjugated diene polymer, and vulcanizing the rubbery composition.

JOSEPH HUGH MACEY.

REFERENCES CITED

The following references are of record in the file of this patent:

UNITED STATES PATENTS

| Number | Name | Date |
|---|---|---|
| 2,377,153 | Hunter et al. | May 29, 1945 |
| 2,455,910 | Alderson | Dec. 14, 1948 |

FOREIGN PATENTS

| Number | Country | Date |
|---|---|---|
| 602,677 | Great Britain | June 1, 1948 |